(12) United States Patent
Grapov et al.

(10) Patent No.: US 8,320,426 B2
(45) Date of Patent: Nov. 27, 2012

(54) APPARATUS FOR SELECTIVELY DISTRIBUTING ENERGY FROM A LASER BEAM

(75) Inventors: Yuri Grapov, Sutton, MA (US);
William D. Jones, Wrentham, MA (US);
Michael Digiantommaso, Oxford, MA (US)

(73) Assignee: IPG Photonics Corporation, Oxford, MA (US)

( * ) Notice: Subject to any disclaimer, the term of this patent is extended or adjusted under 35 U.S.C. 154(b) by 210 days.

(21) Appl. No.: 12/319,068

(22) Filed: Dec. 31, 2008

(65) Prior Publication Data

US 2010/0166029 A1 Jul. 1, 2010

(51) Int. Cl.
*H01S 3/08* (2006.01)
(52) U.S. Cl. .................. 372/107; 372/34; 359/226.1
(58) Field of Classification Search ............ 372/34, 372/107; 359/226.1
See application file for complete search history.

(56) References Cited

U.S. PATENT DOCUMENTS

| | | | | |
|---|---|---|---|---|
| 5,204,922 A * | 4/1993 | Weir et al. | ............... | 385/18 |
| 5,394,270 A * | 2/1995 | Sturm | ............... | 359/636 |
| 5,502,740 A * | 3/1996 | Welsch et al. | ............... | 372/82 |
| 5,948,291 A * | 9/1999 | Neylan et al. | ............... | 219/121.77 |
| 6,317,212 B1 * | 11/2001 | Eckles | ............... | 356/437 |
| 6,873,448 B2 * | 3/2005 | Togawa et al. | ............... | 359/226.1 |
| 2007/0029289 A1 * | 2/2007 | Brown | ............... | 219/121.6 |

* cited by examiner

*Primary Examiner* — Yuanda Zhang
(74) *Attorney, Agent, or Firm* — Yari Kateshov; Timothy D. King

(57) ABSTRACT

An assembly for distributing laser energy is provided that is formed using a compact rigid housing with a sealed beam path contained therein. The assembly employs a monolithic housing with modular collimator and mirror switching components installed therein to reduce its size while maintaining a sealed beam path thereby reducing the possibility of contamination of the beam path. Other than the optics and mirror, there are no elements of the distribution device contained within the beam path. In one embodiment, the assembly distributes incoming energy from a single source to one or more outputs. In another embodiment, the assembly operates as a beam combiner to direct energy from one or more sources to a single output.

11 Claims, 6 Drawing Sheets

APPARATUS FOR SELECTIVELY DISTRIBUTING ENERGY FROM A LASER BEAM

BACKGROUND OF THE DISCLOSURE

The present disclosure relates generally to an apparatus for selectively distributing a laser beam from a single laser source to one of a plurality of outputs. More specifically, the present disclosure relates to a sealed apparatus through which laser energy from a single source is directed in a manner that selectively distributes the laser energy to one of a plurality of outputs while protecting the distribution elements contained therein from contamination.

Laser technology has developed greatly over the past few decades in a manner that finds lasers being used in a multitude of environments to accomplish a great number of tasks. Some well-known processes for which lasers are being employed include telecommunications, machining of tools and parts and medical procedures. Further, the number of applications in which lasers are employed continues to increase as the power level of the available lasers increases. As the power level of the energy being transmitted along the fiber increases, such as laser energy employed in medical treatment and diagnosis, the need for precise, the need to provide low loss coupling greatly increases. Further, such couplers must often aggregate energy from multiple conduits into a single transmission fiber or distribute the energy from a single laser source to one or a plurality of outputs.

There are now a number of high-power single-mode fiber lasers having output power in the range of 1-50 kW that are coming into widespread use in the industrial fields of welding, high-speed cutting, brazing, and drilling. Such fiber lasers have high wall plug power efficiency and very good beam characteristics. The beam from these fiber lasers can be focused to small spot sizes with long focal length lenses with consistent beam properties independent of power level or pulse duration. Ytterbium single-mode fiber lasers with an $M^2$ of 1.1 have continually increased in power to the multi-kW level, and can be focused to 10-15 μm spot diameters with perfect Gaussian distribution. Further increasing power will open up additional markets in the future.

One of the difficulties that has arisen is that as the power of the laser energy that must be distributed increases, the difficulty relating to the distribution of that energy also greatly increases. These distribution systems must be robust and capable of handling the waste heat generated through the distribution of the laser energy. Further, the devices must provide a very stable platform onto which all of the various components are installed to insure correct alignment of the various input and output ports to prevent losses resulting from poorly aligned components.

In the prior art, such distribution systems are typically built on a large and heavy slab of metal that serves as a base platform to which the other components are mounted. In addition to the various switching mirrors used to distribute the laser energy, motors for moving the mirrors, electrical wiring and coolant conduits are all installed on the platform. Once assembled, a cover is then placed over the top of the platform to protect all of the elements contained thereon. This arrangement, however, creates problems of its own in that all of the components are contained within the same cavity through which the laser energy is distributed. The heat generated by the laser energy is transferred into the various other components contained within the beam cavity. As the wires, pipes and motor windings are heated, they off gas coating all of the components within the beam cavity including the switching mirrors and optics with a film that obscures these optical elements resulting is energy loss during distribution operations. In addition, operation of the motors causes dust to be emitted that can also settle onto the optical elements. Further, should any component within the beam cavity fail or require servicing, the entire device must be shut down so that the cover can be removed to allow access to the components contained therein.

Therefore, there is a need for an apparatus that can selectively distribute a laser beam from a single laser source to one of a plurality of outputs.

There is a further need for a reduced size, sealed apparatus through which laser energy from a single source is directed in a manner that selectively distributes the laser energy to one of a plurality of outputs while protecting the distribution elements contained therein from contamination.

Still further there is a need for an apparatus for distributing laser energy that is compact and modular in nature while providing a sealed beam cavity that protects the optics contained therein from the contamination issues encountered in the prior art.

Yet there is a further need for an apparatus for distributing laser energy configured with reflective components witch are contained within the housing of apparatus, whereas the remainder of the apparatus is outside of the housing yet supported in a manner that allows 360° of rotational adjustment to facilitate carefully alignment of the reflective components.

BRIEF SUMMARY OF THE DISCLOSURE

In this regard, the present disclosure provides for an apparatus for selectively distributing a laser beam. The apparatus can be employed for distributing laser energy from a single laser source to one of a plurality of outputs or from a plurality of laser sources to a single output. More specifically, the present disclosure relates to a sealed apparatus through which laser energy from a single source is directed in a manner that selectively distributes the laser energy while protecting the distribution elements contained therein from contamination.

Generally, in the context of the present disclosure, an assembly for distributing laser energy is provided with a compact rigid housing with a sealed beam path contained therein. Other than the optics and mirror components required selectively direct the beam energy, there are no elements of the distribution device contained within the beam path. This arrangement allows for compact and reliable beam distribution while greatly reducing the possibility of contaminating the optics within the beam path.

In one embodiment, the present disclosure operates to distribute incoming energy from a single source to one or more outputs. In this embodiment, an input port is provided at one end of the housing such that the laser energy is directed into a beam path within the housing. Along one side of the housing, two or more output ports are provided to which the beam energy is to be selectively distributed. Opposite the output ports, selectively positionable mirrors are provided that are operable between an in-beam and an out-of-beam position to selectively direct the energy from the input source to the desired output. In addition, in the scope of the present disclosure it is possible that the mirrors are coated in a manner that allows a portion of the beam energy to pass therethrough even when the in-beam position such that the device of the present disclosure operates as a beam sharer.

In another embodiment, the present disclosure operates as a beam combiner to direct energy from one or more sources to a single output. While the assembly is the same as in the embodiment above, the source energy is now coupled to the ports on the side of the housing and the desired output is coupled to the end of the housing. In this embodiment, the selectively positionable mirrors are preferably one-way mirrors allowing energy that impacts the rear of the mirror to pass therethrough.

An important feature of the present disclosure is the arrangement of the mirrors and the motors used to selectively position the mirrors. While the mirrors are contained within the beam cavity, the remainder of the assembly is outside of the housing. The assembly is received in a port within the housing in a manner that allows 360° of rotational adjustment so that the mirror can be carefully aligned to insure near lossless distribution of the beam energy as it passes through the device. This arrangement keeps the electronics, motors, bearings and adjustments of the mirror switching external to the beam cavity herby reducing the number of potential contaminants contained therein.

These and other features of the disclosure are pointed out with particularity in the claims annexed hereto. For a better understanding of the disclosure, its operating advantages and the specific objects attained by its uses, reference should be had to the accompanying drawings and descriptive matter in which there is illustrated a preferred embodiment of the disclosure.

BRIEF DESCRIPTION OF THE DRAWINGS

In the drawings which illustrate the best mode presently contemplated for carrying out the present disclosure.

SPECIFIC DESCRIPTION OF THE DISCLOSURE

Figure 1:
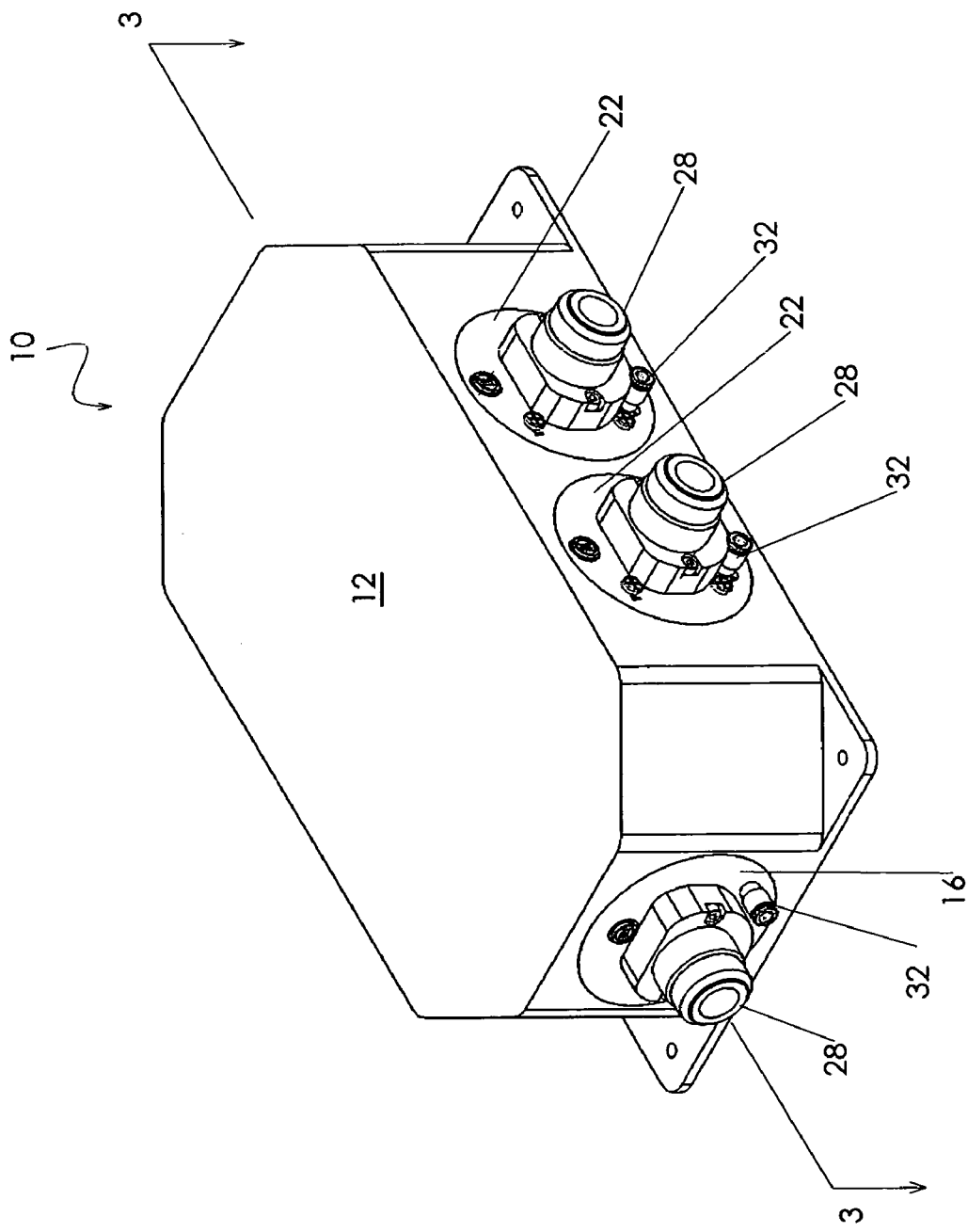
FIG. 1 is a perspective view of the apparatus of the present disclosure for selectively distributing a laser beam.

Now referring to the drawing figures an apparatus for selectively distributing a laser beam is shown and illustrated. The apparatus can be employed for distributing laser energy from a single laser source to one of a plurality of outputs or from a plurality of laser sources to a single output. More specifically, the present disclosure relates to a sealed apparatus through which laser energy from at least one source is directed in a manner that selectively distributes the laser energy while protecting the distribution elements contained therein from contamination.

Turning to FIG. 1, it can be seen that the assembly 10 for distributing laser energy of the present disclosure is configured with a compact rigid housing 12. The housing 12 is monolithic with heavy wall construction and structured so that all of the elements installed therein are held in a manner such that their relative positioning is precisely maintained. As will be described in detail below, the housing 12 contains a sealed beam cavity therein. In this manner, other than the optics and mirror components required selectively direct the beam energy, there are no elements of the distribution device contained within the beam cavity. This arrangement allows for compact and reliable beam distribution while greatly reducing the possibility of contaminating the optics within the beam cavity.

Figure 2:
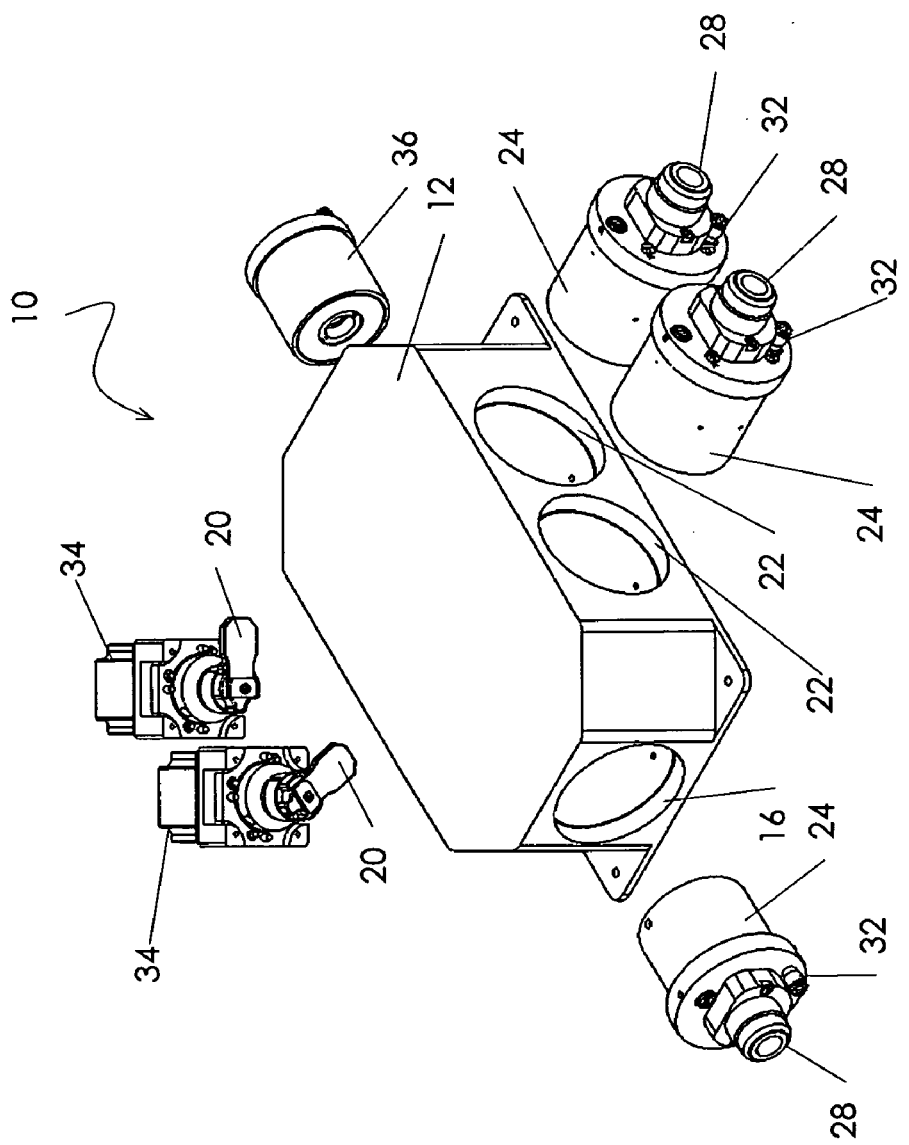
FIG. 2 is an exploded perspective view of the apparatus of the present disclosure for selectively distributing a laser beam.
Figure 3:
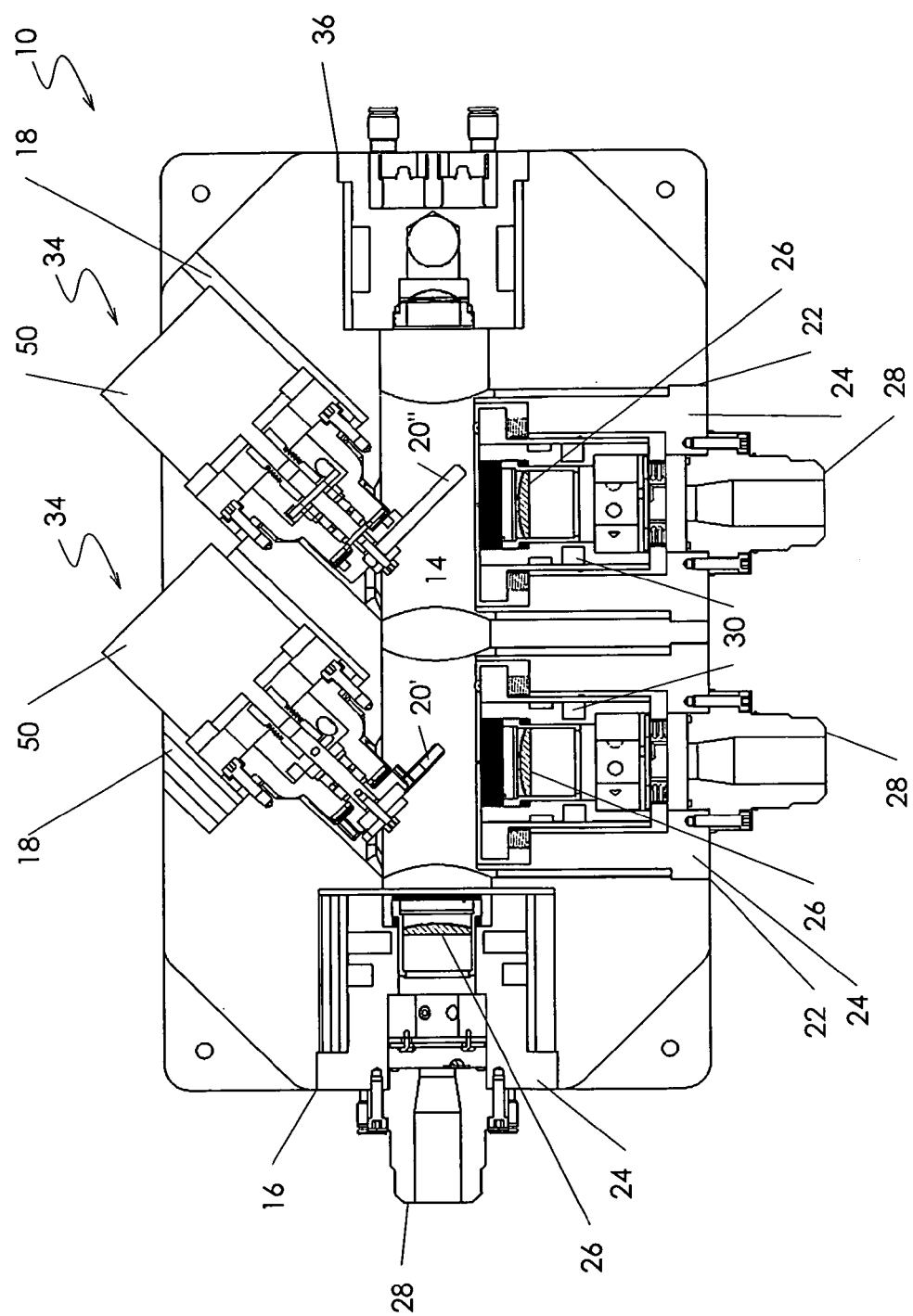
FIG. 3 is a cross-sectional view taken along line 3-3 of FIG. 1.

Turning to FIGS. 2 and 3, it can be seen that the housing 12 includes a sealed beam cavity 14 (FIG. 3) that is defined within the housing 12. The beam cavity 14 is the space within the housing 12 in which the laser beam energy travels. As was noted above when numerous components relating to the operation of the beam distribution apparatus 10 are contained within the beam cavity 14, the risk of contaminating the various optical elements contained therein greatly increases. As a result, it can be seen that the only elements within the beam cavity 14 are the optics used in connection with the beam distribution function. In addition, there can be seen at least one input port 16 configured to direct beam energy from the laser into the beam cavity 14, at least one control port 18 including a mirror 20 disposed within the beam cavity 14, wherein the mirror 20 is movable between a first in-beam position (see 20' in FIG. 3) to redirect laser energy from the at least one input port 16 and a second out-of-beam position (see 20" in FIG. 3) wherein the laser energy is unaffected by the mirror 20 and at least one output port 22 configured to receive redirected beam energy from the mirror 20 in the in-beam position 20' and direct it out of the beam cavity 14.

While in this particular illustration, there is shown one input and two outputs, this is meant to be illustrative of a preferred embodiment and is not intended to limit the scope of this disclosure to the specifically illustrated embodiment. Accordingly, it is possible to have at least one input and at least one output as well as having a plurality of inputs and/or a plurality of outputs and any combination thereof. Any such arrangement is intended to fall within the scope of the present disclosure.

A collimator 24 assembly can be seen installed into each of the input 16 and output ports 22. The collimator assemblies 24 are modular in construction and include optics 26 therein to shape and focus the laser beam energy as it is launched into the beam cavity 14 and as it is distributed and relaunched using the output ports 22. Further, it can be seen that each of the collimators 24 includes a modular connector 28 on an outboard end thereof to allow easy connection of a waveguide thereto. On the input port 16 of collimator 24 a waveguide is attached using the modular connection 28, wherein the waveguide serves to provide laser beam energy for distribution by the apparatus 10 of the present disclosure. Such a waveguide is preferably a fiber that extends from a fiber laser but may be any other known type of waveguide for propagating optical energy. On the output port 22 collimator 24, waveguides are attached that serve to propagate the distributed laser energy to various terminal devices such as tools or the like. It can be further seen that each of the collimators 24 includes an integrated coolant path 30 (FIG. 3) therein and integrated connections 32 (FIG. 2) for integration with a cooling system. In this manner, the modular collimators 24 are each cooled in a manner that keeps the cooling components out of and away from the beam cavity 14.

In the housing 12 opposite the output ports 22 there can be seen at least one control port 18 wherein the control port 18 receives a mirror apparatus 34 for selectively distributing laser energy. While the details relating to the structure of the mirror apparatus 34 will be discussed below, functionally, the mirror apparatus 34 includes a mirror 20 disposed within the beam cavity 14, wherein the mirror 20 is movable between a first in-beam position 20' (FIG. 3) to direct laser energy entering the apparatus 10 through the at least one input port 16 to the at least one output port 22 and a second out-of-beam position 20" wherein the laser energy is unaffected by the mirror 20.

Additionally, there can be seen a dump port 36 that is positioned opposite the input port 16. The dump port 36 is configured and arranged to absorb the laser beam energy if all of the mirrors 20 are in the out-of-beam position 20". This prevents the laser energy from destroying the housing 12 or burning the components contained within the beam cavity 14.

In one preferred embodiment the present disclosure provides for exactly one input port 16, at least two control ports 18 and at least two output ports 22 corresponding to each of the control ports 18. Further there is a dump port 36 as described above opposite the input port 16 for absorbing laser energy should the mirrors 20 all be positioned in the out-of-beam position 20". By selectively moving the mirrors 20 at each of the control ports 18, the laser energy can be redirected from the input port 16 to either one of the corresponding output ports 22. Also within the scope of this embodiment, it is possible that only the mirror 20 positioned furthest from the input port 16 is fully reflective and the remaining mirrors 20 are partially reflective such that positioning more than one of the mirrors 20 in the in-beam position 20' directs a portion of the laser energy to the corresponding output ports 22. This allows beam sharing of a portion of the beam energy at each of the output ports 22.

It should be appreciated by one skilled in the art that the positioning of the outputs and inputs in the preferred embodiment can be reversed such that at least to laser beams are directed into the output ports (which now function as input ports) and the energy is then directed through selective movement of the mirrors at each of the control ports to redirect laser beam energy from the to the input port (now functioning as an output port). This arrangement allows energy from two different lasers to be shared at one location. In this embodiment, it should be appreciated that there needs to be at least two dump ports opposite each of the outputs (functioning as inputs) wherein the dump ports are configured and arranged to absorb the corresponding laser beam energy when its corresponding mirror is in the out-of-beam position. Further in this embodiment the mirrors may be formed as one-way mirrors such that positioning more than one of the mirrors in the in-beam position allows laser energy from a rear surface of the mirror to pass therethrough thereby directing the laser energy from each of the inputs to the output port. Such an arrangement would allow the apparatus to operate as a beam combiner.

Figure 4:
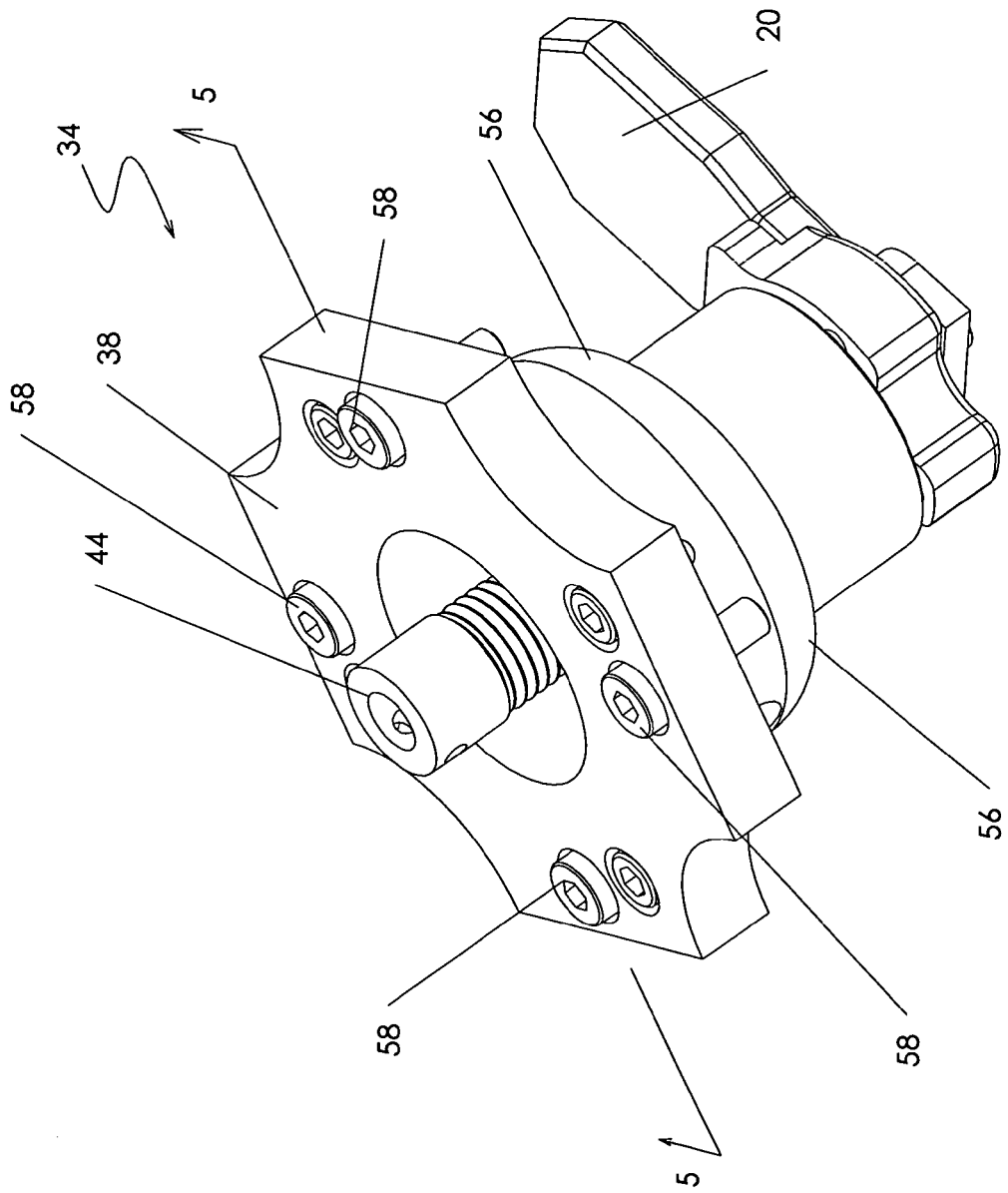
FIG. 4 is a perspective view of the head portion of the mirror positioning apparatus of the present disclosure.
Figure 5:
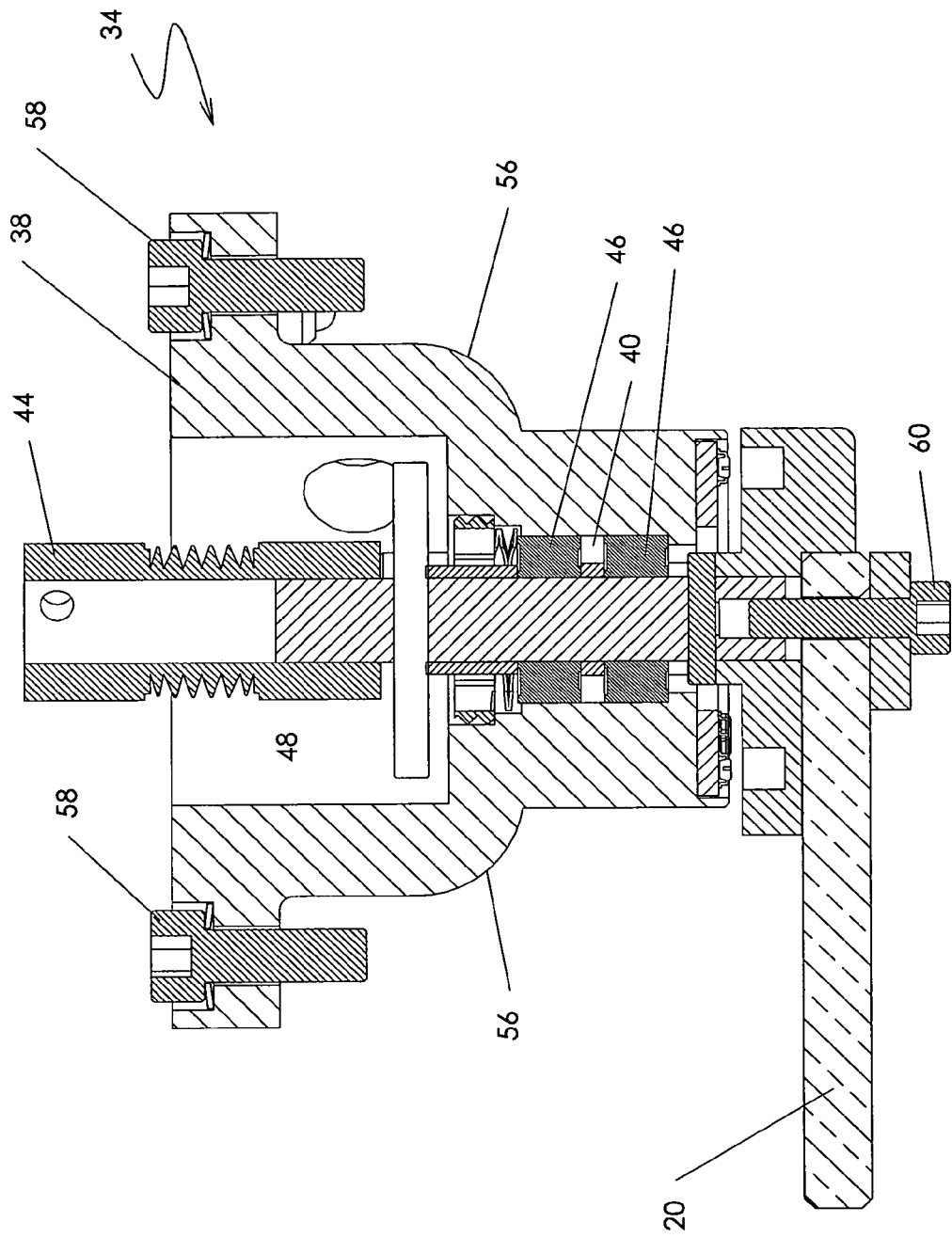
FIG. 5 is a cross-sectional view taken along line 5-5 of FIG. 4.

Turning now to FIGS. 4 and 5, the details of the mirror apparatus 34 for selectively distributing energy from a laser beam in the apparatus 10 of the present disclosure are shown and illustrated. The mirror apparatus 34 generally includes a support plate 38 having an aperture 40 that extends therethrough. A rotatable shaft 42 can be seen to extend through the aperture 40. A mirror 20 is shown to a first end of the shaft 42 and a drive interface 44 is affixed to a second end of the shaft 42. Further, a bearing 46 can be seen installed in the aperture 40 and about the shaft 42 wherein the bearing 46 serves to seal the mirror apparatus 34 to prevent any fluid or contamination from passing from one side of the support plate 38 to the other, and further serves to precisely guide rotation of the shaft 42. The housing 12 has an opening 48 which . . . the mechanical steps to limit the mirror movement.

Figure 6:
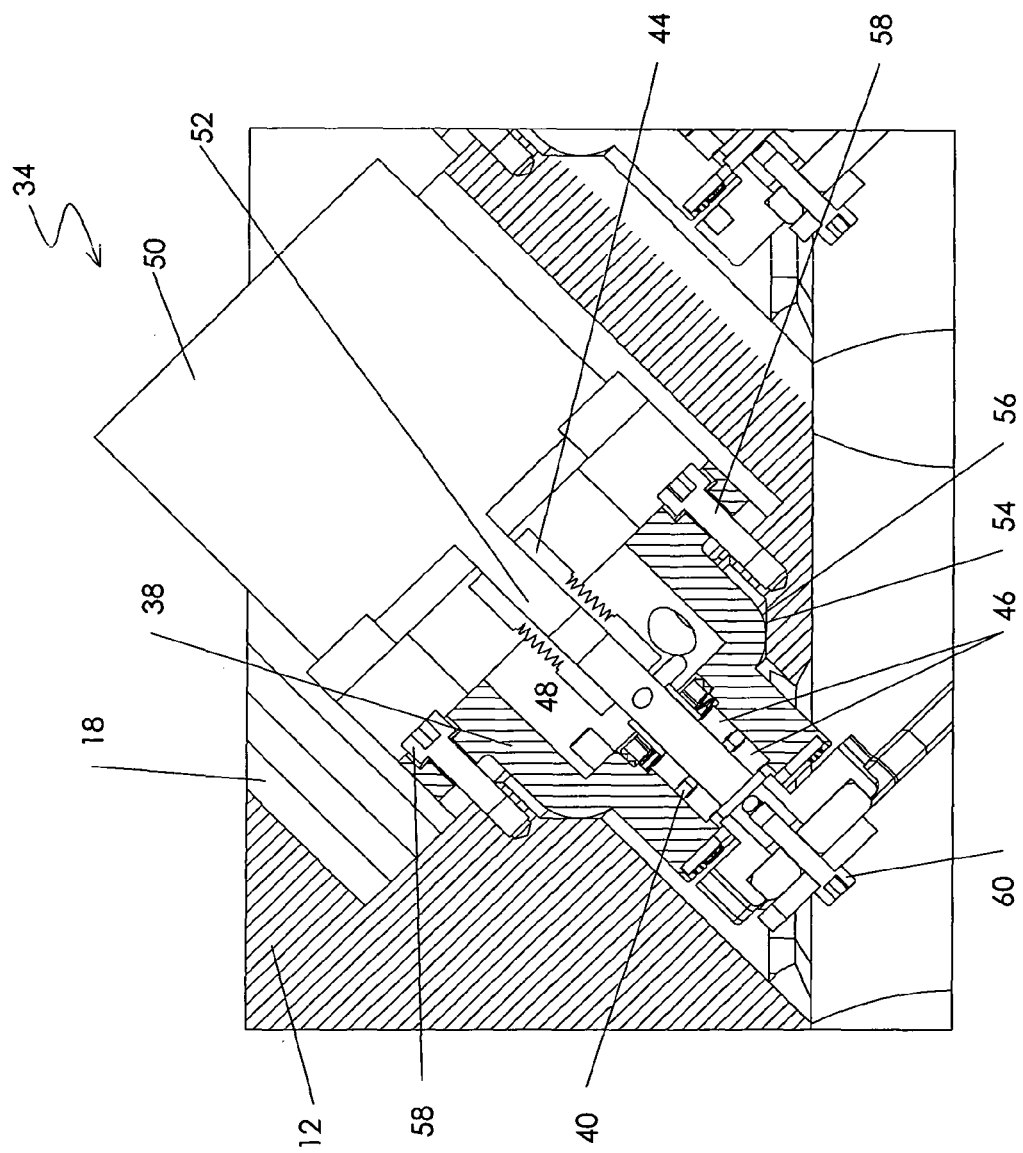
FIG. 6 is a cross-sectional view of the head and motor of the mirror positioning apparatus installed into a housing.

Turning now to FIG. 6 in combination with FIGS. 4 and 5, a motor 50 can be seen installed into the mirror apparatus 34 wherein the drive shaft 52 of the motor 50 is affixed to the drive interface 44. Preferably the motor 50 is a stepper motor that serves to selectively step the mirror 20 precisely between an in-beam position 20' and an out-of-beam position 20". It is of further note that in the scope of the present disclosure the drive interface 44 is preferably flexible such that vibrations associated with the operation of the motor 50 and any misalignment of the motor's rotation is not transferred into the shaft 42 thereby preventing it from causing misalignment in the mirror 20 position.

The mirror apparatus 34 is received into one of the control ports 18 in the housing 12 wherein the control port 18 is particularly configured to receive the mirror apparatus 34 and includes a seat 54 formed therein against which the mirror apparatus 34 is received. The support plate 38 of the mirror apparatus 34 can be seen to include a rounded support shoulder 56 that extends around an outer surface thereof. When in the installed position, the support shoulder 56 contacts the seat 54 and is configured and received against the seat 54 in a manner that allows the angular position of the mirror assembly 34 can be adjusted relative to the housing 12 and ultimately the beam path. The support plate 38 includes setscrews 58 therein that can be tightened or loosened in order to adjust the angular position of the mirror assembly 34 relative to the housing 12. This allows the beam distribution assembly 10 of the present disclosure to be carefully aligned and calibrated to insure a low loss coupling of the beam energy between the beam input and output ports.

Finally it can be seen that the mirror 20 is releasably secured to the shaft 42. This is done via any known fastening means in the art such as by using screws 60 as shown herein. This allows replacement of the mirror 20 and allows the housing 12 to be smaller in that the mirror 20 can be secured to the shaft 42 after the support plate 38 is installed into the housing 12.

It can therefore be seen that the present disclosure provides an apparatus that can selectively distribute a laser beam either from a single laser source to a plurality of outputs or from a plurality of sources to a single output via a reduced size, sealed apparatus while protecting the distribution elements contained therein from contamination. Further, a beam switch is provided for use in a laser beam distribution assembly wherein the mirrors of the beam switch are contained within the beam cavity and the remainder of the beam switch assembly is outside of the housing yet supported in a manner that allows 360° of rotational adjustment to facilitate carefully alignment of the mirror. For these reasons, the instant disclosure is believed to represent a significant advancement in the art, which has substantial commercial merit.

While there is shown and described herein certain specific structure embodying the disclosure, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The invention claimed is:

1. An apparatus for selectively distributing energy from at least one laser beam comprising:
   a housing extending along a longitudinal axis and having axially spaced front and rear sides and opposing axially extending sides;
   an elongated sealed chamber defining a beam cavity within the housing, and limited between opposing portions of respective front and rear sides of the housing and a pair of elongated side walls, the side walls bridging the opposing portions of respective front and rear sides and spaced radially inwards from the opposing axially extending sides of the housing;

at least one input port axially extending through the portion of the front side of the housing and opening into the beam cavity;

at least one output port being provided on one of the opposing sides and extending so as to open into the beam cavity;

at least one control port mounted on the other of the opposing sides opposite the at least one output port, the control port including a mirror disposed within the beam cavity, wherein the mirror is movable between a first in-beam position to direct the at least one laser beam, entering the cavity through at least one input port, to the at least one output port, and a second out-of-beam position wherein the laser energy is unaffected by the mirror allowing the laser beam to axially propagate towards the rear side of the housing, and a motor mounted in the housing outside the cavity and operative to control the position of the mirror.

2. The apparatus of claim 1 further comprising: a collimator installed in each of said at least one input and at least one output ports wherein said beam cavity is completely sealed.

3. The apparatus of claim 2, wherein each of the collimators include a modular connector on an outboard end thereof to allow connection of a waveguide thereto.

4. The apparatus of claim 2, wherein each of the collimators include integrated coolant paths therein and integrated connections for integration with a cooling system.

5. The apparatus of claim 1, wherein the motor is coupled to the mirror by a linkage.

6. The apparatus of claim 1, further comprising:
exactly one input port;
at least two output ports; and
at least two control ports, wherein each of said control ports is positioned opposite a corresponding one of said two output ports, selective movement of the mirrors at each of said control ports causing said laser beam from said input port to be selectively distributed to one of said at least two output ports.

7. The apparatus of claim 6 further comprising: a dump port at the rear side of said housing axially opposite said input port, said dump port being configured and arranged to absorb the laser beam energy if all of the mirrors are in the out-of-beam position.

8. The apparatus of claim 6, wherein the mirror positioned furthest from the input is fully reflective and the remaining mirrors are partially reflective such that positioning more than one of the mirrors in the in-beam position directs a portion of the laser energy to the corresponding output ports.

9. The apparatus of claim 1 further comprising:
exactly one output port;
at least two input ports; and
at least two control ports, wherein each of said control ports is positioned opposite a corresponding one of said input ports, wherein selective movement of the mirrors at each of the control ports causes a laser beam from each of the input ports to be selectively distributed to the output port.

10. The apparatus of claim 9 further comprising: at least two dump ports positioned in said housing opposite each of said inputs, said dump ports configured and arranged to absorb the corresponding laser beam energy when its corresponding mirror is in the out-of-beam position.

11. The apparatus of claim 9, wherein the mirrors are configured as respective one-way mirrors such that positioning more than one of the mirrors in the in-beam position allows laser energy from a rear surface of the mirror to pass therethrough thereby directing the laser energy from each of the inputs to the output port.

\* \* \* \* \*